UNITED STATES PATENT OFFICE.

WILLIAM R. SEIGLE, OF NEW YORK, N. Y., ASSIGNOR TO H. W. JOHNS-MANVILLE COMPANY, OF NEW YORK, N. Y., A CORPORATION OF NEW YORK.

METHOD OF PRODUCING BODIES OF EXTENDED DISCONTINUOUSLY-ASSOCIATED SOLID PARTICLES AND THE PRODUCT THEREOF.

1,228,485.    Specification of Letters Patent.    Patented June 5, 1917.

No Drawing.    Application filed June 1, 1915. Serial No. 31,504.

*To all whom it may concern:*

Be it known that I, WILLIAM R. SEIGLE, a citizen of the United States, and resident of New York city, in the county of New York and State of New York, have invented new and useful Improvements in Methods of Producing Bodies of Extended Discontinuously-Associated Solid Particles and the Product Thereof, of which the following is a specification.

My invention consists of a method or process, and its product. The product which constitutes part of my invention is a body composed of extended, or discontinuously associated, particles of solid material, and the method or process which constitutes the other part of my invention is that by which particles of solid material are aggregated to form a body or mass, and are extended, or discontinuously associated so as to make the body or mass more bulky, weight for weight, than bodies or masses composed of similar particles have been made heretofore.

Some of the practical objects subserved by the invention are: the provision of heat insulating materials of high efficiency and very light weight in contrast to bulk; the reduction of waste in the manufacture of molded heat insulators; and the increase in surface covering capacity of heat insulating plastering and painting materials, with attendant improvement in their heat insulating property. Incidentally also, my invention works economies in the manufacture of typical materials of the class indicated, by rendering available as marketable products, materials which have heretofore been wholly, or partly, disposed of as waste.

My invention in its method aspect, has been found applicable to many solid materials, in that it effects a greater extension, or discontinuity of association of component particles, in bodies composed of comminuted particles of these materials than has, so far as I am informed, heretofore been produced. To what extent new or increased utilities may be served by bodies of solid material thus treated and produced, in all cases, I am not now able to forecast; but in respect to two instances (namely, calcium and magnesium carbonates) of the process and product which constitute my invention, the products are decidedly improved and made to subserve their old uses in an improved manner or to subserve new uses.

I therefore take these materials as affording the best particular illustration of my invention, and as also representing the class of materials which respond to my new process and are by it made into the newly characterized product.

Bodies of magnesium carbonate (more precisely, basic magnesium carbonate) have heretofore been extensively manufactured and used for heat insulating purposes, either as preformed blocks or shapes—as for pipe coverings,—or as masses plastered over a surface and then allowed to dry.

A brief description of the mode by which such magnesia insulating coverings have been manufactured will make clearer the explanation of my invention.

*I. The magnesium-process heretofore practised and its product.*

The raw material has usually been dolomite rock, which comprises a mixture of calcium and magnesium carbonates in about equal quantities. This mixed carbonate, after calcination, slakes more smoothly than will calcined magnesia alone, and hence is selected as the raw material, rather than a purer magnesium carbonate. The dolomite rock is crushed, and then calcined with coke in a kiln, producing calcium and magnesium oxids. The mixed oxids are then slaked with water, producing a mush, or milk, of calcium and magnesium hydroxids. This watery mixture is then charged under pressure in a suitably closed tank with $CO_2$ gas. Since magnesium carbonate is soluble under pressure in water charged with $CO_2$, the formation of calcium and magnesium carbonates is accompanied by solution of the magnesium carbonate; the magnesium carbonate solution is filtered out, under pressure, leaving the insoluble calcium carbonate behind. This solution is then boiled to drive off the $CO_2$ and thus to precipitate the magnesium carbonate, which is a magnesium hydrogen carbonate, or basic carbonate.

(The calcium carbonate residue has heretofore been treated almost wholly as a waste product, since its value is too small, under usually prevailing conditions, to justify shipment from the place of manufacture.

My process is applicable not only to the magnesium carbonate product but also to the calcium carbonate, and converts the latter into a valuable commercial product, eliminating the waste heretofore incident to the manufacture of the magnesium product).

Then, a fiber, usually asbestos fiber, is mixed into the mush or milk of basic magnesium carbonate; the mixing is best accomplished by blowing air in large quantities up through the water in the tank, which contains the carbonate of magnesium.

The mixture of basic carbonate of magnesium and asbestos fiber being accomplished, the fluid mass is then led through pipes to filter molds, in which masses of the mixture are cast under pressure (usually about thirty pounds to the square inch), the water escaping through the mold filters.

In drying, the insulating blocks shrink considerably and what is worse, irregularly, so that many of them have to be reshaped; this incidentally produces large quantities of waste which is quite difficult to work over again.

To the industrial condition above very briefly outlined, my improvements are applied.

II. Specific illustration of my invention.

Assume that a tank contains thirty thousand pounds of the mush, composed of basic magnesium carbonate, of which the carbonate itself contributes three thousand pounds, and that this mush has been made by the process above described. To this magnesium carbonate mush, add about thirty pounds of soluble soap. Old-fashioned soft soap will be found entirely suitable. Then, if desired, add the usual proportion of asbestos fiber, and stir the whole by admitting air under pressure, causing the mush to effervesce violently.

Then, as in the old process, draw off the mush into filter molds, but reduce the pressure at the molds to about six pounds per square inch. When the water has filtered out, the molds are opened, and the cast blocks removed and allowed to dry. These blocks or other cast shapes shrink but little, and shrink regularly, so that little or no waste results.

Size for size, these blocks or other cast shapes weigh but little more than half as much as the old product. They possess sufficient mechanical strength, and are much less hygroscopic than the old product. Their heat insulating property is better than that of the old product.

III. A modification of the new process.

If there is added to the basic magnesium carbonate mush, with the soap, as above described, a quantity of wood fiber or other cellulose fiber, preferably that made by the well known sulfite process, in other words, sulfite pulp; the mass, after being blown with air, becomes much thicker,—so thick that if the usual proportions of magnesia and fiber are used, the product cannot readily be drawn off through pipes under pressure. Therefore, when using sulfite pulp, first reduce or dilute the mush until it contains about half as much carbonate of magnesium as before. This enables the manufacturer to run the final mixture through pipes to the filter molds, when cast shapes are produced in the usual way. Here, again, the pressure at the molds should be moderate, about six pounds to the square inch. The cast products, when dry, possess all the improved characteristics enumerated in respect to the product comprising asbestos fibers, and are, moreover, nearly if not quite as effectively fire-resistant as those in which asbestos is used as the fibrous binder. If desired, a mixture of asbestos fiber and sulfite pulp may be employed with good results.

IV. Treatment of the carbonate of calcium residue left after filtration of the magnesium carbonate solution as by the old process.

As described above under head I, the magnesia solution is obtained by charging the water containing slaked calcium hydroxid and magnesium hydroxid, with carbonic acid gas under pressure, and filtering off the dissolved magnesium carbonate in the water, leaving a pasty mass of insoluble calcium carbonate, in which, however, a proportion of magnesium carbonate remains. This, ordinarily, has been treated as waste. When dried it becomes hard, stony and only of trifling value.

Instead of throwing this calcium carbonate away as waste, or selling it for whatever small price it will bring, the calcium carbonate residue, containing a small proportion of magnesium carbonate, is mixed with fresh water, in quantity sufficient to form a thick "milk". Into this "milk" is mixed a quantity of asbestos fiber and sulfite fiber, in about the same proportions, relatively to the weight of calcium carbonate, as are usual in the case of asbestos fiber and magnesium carbonate. This mixture of fiber and carbonate is then violently stirred, preferably by blowing air into the water, and a small amount of soluble soap added. The mixture creams and foams and can, after a few minutes of such treatment, be then drawn into filtered molds, when the water is filtered out under moderate pressure, say,—five or six pounds per square inch.

On drying, the solid molded masses are found to be light, porous, friable; of about the same weight per cubic foot as the magnesium carbonate blocks and shapes produced by the old process (see head I above) and possessing high heat insulating capacity.

Though by no means positively certain, I am inclined to believe that the presence of the residual magnesia in the calcium carbonate is responsible for the action of the soluble soap. When dry, the extended masses of loosely bonded particles of calcium carbonate and fiber may then be recomminuted, forming a dry material adapted to be mixed with water and used as plaster for interior wall-surfaces or elsewhere. The extended condition of the material persists, and plastering made therefrom will cover much more surface, pound for pound, than any other lime plastering of which I have knowledge.

*V. The physical conditions essential to the process and product.*

The technical effect is the same, and the result accomplished in substantial degree by treating the magnesium carbonate mush with soap, without any fibrous binder. Asbestos fibers, or other fibers, vegetable or animal, appear merely to produce their expected mechanical binding effect.

If some of the water is drawn off from the magnesium carbonate mush, and filtered so that it is clear, and a soluble soap be added to this clear liquor, the presence therein of a small residue of basic magnesium carbonate in solution produces an insoluble magnesium soap. If this liquor with the insoluble magnesium soap in it, is added to a quantity of magnesium carbonate mush, and stirred in, the new result appears, though not so readily or perfectly, since it is difficult to secure a uniform distribution of the insoluble metallic soap through the mass. When, as hereinabove described, the soluble soap is added to the mush and stirred in by blowing, the insoluble soap will necessarily be formed everywhere in the mass, and be thoroughly distributed.

This experiment with a pre-formed insoluble metallic (magnesium) soap indicates that the formation of the same insoluble soap *in situ* in the magnesium carbonate mush or in the milky mixture made by adding water to the calcium carbonate residue, which contains magnesia (head IV) is responsible for the new result observed.

*VI. The functional significance of air blowing.*

It has been observed that in the old process hereinabove described, if the magnesia mush was stirred mechanically with paddles, the cast shapes were heavier for their bulk than when air stirring was employed. So also it has been observed that when the new process herein described is carried out by mechanical stirring, the product is heavier, more compact, or "soggier" than when the air blowing is resorted to. This superiority of air stirring over mechanical stirring in the old process, was doubtless due to the attachment of minute air bubbles to the finely divided magnesium, which carried the air bubbles into the molds, retaining them enmeshed so that the air spaces made by these bubbles extended the mass, when dried.

*VII. Probable structural effect of insoluble metallic soap in the magnesia mass, or calcium carbonate mass.*

The capacity to form tenuous films is characteristic of soaps. This is exemplified in the familiar phenomenon of suds and soap bubbles, and by the use of some of the insoluble metallic soaps as paint ingredients for special purposes such as coating the bottoms of ships.

Wherever a suds or froth is formed, there exists a cellular film-structure, in which gases are imprisoned. By frothing the magnesium carbonate suds by air blowing, innumerable air bubbles are formed which— even without the presence of a soap—tend to attach themselves to the magnesia particles and are entangled among the magnesia particles (and fibers also, if these are present, as usual). If the insoluble metallic soap is distributed through the frothing mass, the films of soap, it is believed, form persistent bubbles, which in the aggregate agglomerate upon and between the magnesia particles and fibers, and hold imprisoned the minute air bubbles, retaining a far larger quantity than would remain were no film forming substance present.

Probably also, when the insoluble soap is made by introducing a soluble soap into the water which contains a metallic salt in solution, a froth or suds of soluble soap film is first formed, and these films, in cellular aggregation, are rendered insoluble by the reaction which forms the insoluble soap.

Then, it is believed, the mush carries with it to the filter molds these enmeshed cellular bubble-masses which persist because of the character of the films themselves, and these extend the magnesia and fiber or calcium carbonate and fiber, to form the specifically light products which result, as above described.

To test this hypothesis, apply higher pressure at the filter mold than has been prescribed (see head II), say forty pounds to the square inch. The magnesia mass compacts and the resulting cast shape is much heavier than when formed under the more moderate pressure of about six pounds. The degree of pressure which should be applied is that which will practically suffice to expel the water from the mold, and no more. This pressure test indicates that under high pressures the cellular bubble structures are broken down, and the magnesia and fibers caused to settle on each other, and supports the hypothesis that insoluble soap films in cellular aggregation are directly responsible for the final physical result.

The effect of high pressure on the calcium carbonate product (head IV) is the same in kind, and points to the same conclusion.

Treatment of other finely comminuted precipitated solids with soap, under conditions favorable to the production of insoluble soap, is found to result in greater extension of the solid mass, when the liquid is filtered from the precipitate, than usually appears. This phenomenon presents itself on treatment of heavy solid precipitates, such as lead carbonate and barium carbonate.

Bodies produced by the method above described, are, when finally in the dry condition, structurally unitary, while the particles of which they are composed are discontinuously associated, in the sense that particles in any porous body are discontinuously associated. These particles are, moreover extended or spread apart by the distribution therethrough of the insoluble soap, so that their discontinuity is increased in degree, while their association to form the unitary structural body persists.

The specific application of my process, and the specific product thereof, in relation to calcium carbonate, is reserved for claim in an application filed as a division of this application, the said division being serially numbered 106,522, filed on the 28th day of June, 1916.

I claim:

1. The method of producing bodies composed of extended, discontinuously associated particles of solid material, which consists in distributing the particles in a liquid with an insoluble soap, then eliminating the liquid and drying the residual solid.

2. The method of producing bodies composed of extended, discontinuously associated particles of magnesium carbonate, which consists in distributing the particles in a liquid with an insoluble soap, then eliminating the liquid and drying the residual solid.

3. The method of producing bodies composed of extended, discontinuously associated particles of solid material, which consists in distributing the particles mingled with fibers in a liquid with an insoluble soap, then eliminating the liquid and drying the residual solid.

4. The method of producing bodies composed of extended, discontinuously associated particles of solid material, which consists in distributing the particles mingled with asbestos fibers in a liquid with an insoluble soap, then eliminating the liquid and drying the residual solid.

5. The method of producing bodies composed of extended, discontinuously associated particles of solid material, which consists in distributing the particles mingled with asbestos fibers and cellulose fibers in a liquid with an insoluble soap, then eliminating the liquid and drying the residual solid.

6. The method of producing bodies composed of extended, discontinuously associated particles of solid material, which consists in distributing the particles mingled with sulfite pulp fibers in a liquid with an insoluble soap, then eliminating the liquid and drying the residual solid.

7. The method of producing bodies composed of extended, discontinuously associated particles of magnesium carbonate, which consists in distributing the particles mingled with fibers in a liquid with an insoluble soap, then eliminating the liquid and drying the residual solid.

8. The method of producing bodies composed of extended, discontinuously associated particles of magnesium carbonate, which consists in distributing the particles mingled with asbestos fibers, in a liquid with an insoluble soap, then eliminating the liquid and drying the residual solid.

9. The method of producing bodies composed of extended, discontinuously associated particles of magnesium carbonate, which consists in distributing the particles mingled with asbestos fibers and cellulose fibers, in a liquid with an insoluble soap, then eliminating the liquid and drying the residual solid.

10. The method of producing bodies composed of extended, discontinuously associated particles of magnesium carbonate, which consists in distributing the particles mingled with sulfite pulp fibers, in a liquid with an insoluble soap, then eliminating the liquid and drying the residual solid.

11. The method of producing bodies composed of extended, discontinuously associated particles of solid material, which consists in distributing the particles in a liquid with an insoluble soap and agitating, then eliminating the liquid and drying the residual solid.

12. The method of producing bodies composed of extended, discontinuously associated particles of solid material, which consists in distributing the particles in a liquid with an insoluble soap, and blowing air through the liquid to agitate it and its contents, then eliminating the liquid and drying the residual solid.

13. The method of producing bodies composed of extended, discontinuously associated particles of magnesium carbonate in a liquid with an insoluble soap and agitating, then eliminating the liquid and drying the residual solid.

14. The method of producing bodies composed of extended, discontinuously associated particles of magnesium carbonate, which consists in distributing the particles in a liquid with an insoluble soap, and blowing air through the liquid to agitate it and its contents, then eliminating the liquid and drying the residual solid.

15. The method of producing bodies composed of extended, discontinuously associated particles of solid material, which consists in distributing the particles in water containing a metallic salt in solution, adding thereto a soluble soap, then eliminating the water and drying the residual solid.

16. The method of producing bodies composed of extended, discontinuously associated particles of magnesium carbonate, which consists in distributing the particles in water containing a metallic salt in solution, adding thereto a soluble soap, then eliminating the water and drying the residual solid.

17. The method of producing bodies composed of extended, discontinuously associated particles of solid material, which consists in distributing the particles mingled with fibers, in water containing a metallic salt in solution, adding thereto a soluble soap, then eliminating the water and drying the residual solid.

18. The method of producing bodies composed of extended, discontinuously associated particles of solid material, which consists in distributing the particles mingled with asbestos fibers in water containing a metallic salt in solution, adding thereto a soluble soap, then eliminating the water and drying the residual solid.

19. The method of producing bodies composed of extended, discontinuously associated particles of solid material, which consists in distributing the particles mingled with asbestos fibers and cellulose fibers in water containing a metallic salt in solution, adding thereto a soluble soap, then eliminating the water and drying the residual solid.

20. The method of producing bodies composed of extended, discontinuously associated particles of solid material, which consists in distributing the particles mingled with sulfite pulp fibers in water containing a metallic salt in solution, adding thereto a soluble soap, then eliminating the water and drying the residual solid.

21. The method of producing bodies composed of extended, discontinuously associated particles of magnesium carbonate, which consists in distributing the particles mingled with fibers, in water containing a metallic salt in solution, adding thereto a soluble soap, then eliminating the water and drying the residual solid.

22. The method of producing bodies composed of extended, discontinuously associated particles of magnesium carbonate, which consists in distributing the particles mingled with asbestos fibers, in water containing a metallic salt in solution, adding thereto a soluble soap, then eliminating the water and drying the residual solid.

23. The method of producing bodies composed of extended, discontinuously associated particles of magnesium carbonate, which consists in distributing the particles mingled with asbestos fibers and cellulose fibers, in water containing a metallic salt in solution, adding thereto a soluble soap, then eliminating the water and drying the residual solid.

24. The method of producing bodies composed of extended, discontinuously associated particles of magnesium carbonate, which consists in distributing the particles mingled with sulfite pulp fibers, in water containing a metallic salt in solution, adding thereto a soluble soap, then eliminating the water and drying the residual solid.

25. The method of producing bodies composed of extended, discontinuously associated particles of solid material, which consists in distributing the particles in water containing a metallic salt in solution, adding thereto a soluble soap and agitating, then eliminating the water and drying the residual solid.

26. The method of producing bodies composed of extended, discontinuously associated particles of solid material, which consists in distributing the particles in water containing a metallic salt in solution, adding thereto a soluble soap, blowing air through the liquid to agitate it and its contents, then eliminating the water and drying the residual solid.

27. The method of producing bodies composed of extended, discontinuously associated particles of magnesium carbonate, which consists in distributing the particles in water containing a metallic salt in solution, adding thereto a soluble soap and agitating, then eliminating the water and drying the residual solid.

28. The method of producing bodies composed of extended, discontinuously associated particles of magnesium carbonate, which consists in distributing the particles in water containing a metallic salt in solution, adding thereto a soluble soap, blowing air through the liquid to agitate it and its contents, then eliminating the water and drying the residual solid.

29. A body of discontinuously associated particles of solid material porously extended by an insoluble soap distributed through the body.

30. A structurally unitary body comprising discontinuously associated particles of magnesium carbonate extended by an insoluble soap distributed through the mass.

31. A body of discontinuously associated particles of solid material mixed with fibers, porously extended by an insoluble soap distributed through the body.

32. A body comprising discontinuously associated particles of magnesium carbonate mixed with fibers extended by an insoluble soap distributed through the mass.

33. A body comprising discontinuously associated particles of magnesium carbonate mixed with asbestos fibers extended by an insoluble soap distributed through the mass.

34. A body of discontinuously associated particles of magnesium carbonate mixed with asbestos fibers and cellulose fibers, extended by an insoluble soap distributed through the mass.

Signed by me at New York, N. Y., this 28 day of May, 1915.

WILLIAM R. SEIGLE.

Witnesses:
L. R. VEWSOME,
T. O. DENMAN.